(12) United States Patent
Fanucci et al.

(10) Patent No.: US 6,764,057 B2
(45) Date of Patent: Jul. 20, 2004

(54) LOW COST TOOLING TECHNIQUE FOR PRODUCING PULTRUSION DIES

(75) Inventors: Jerome P. Fanucci, Lexington, MA (US); James J. Gorman, Boxborough, MA (US); Christian Koppernaes, Beaufort, SC (US)

(73) Assignee: Kazak Composites, Incorporated, Woburn, MA (US)

( * ) Notice: Subject to any disclaimer, the term of this patent is extended or adjusted under 35 U.S.C. 154(b) by 239 days.

(21) Appl. No.: 10/000,762

(22) Filed: Oct. 23, 2001

(65) Prior Publication Data
US 2002/0088549 A1 Jul. 11, 2002

Related U.S. Application Data
(60) Provisional application No. 60/242,529, filed on Oct. 23, 2000.

(51) Int. Cl.[7] .............................. B28B 7/36; B28B 7/40; B28B 17/00; B29C 67/00
(52) U.S. Cl. ................... 249/135; 425/192 R; 264/136; 264/137; 156/433; 156/441
(58) Field of Search .................................. 156/166, 180, 156/242, 245, 433, 441; 264/136, 137; 425/112, 114, 376.1, 192 R; 249/135

(56) References Cited
U.S. PATENT DOCUMENTS

| | | | | | |
|---|---|---|---|---|---|
| 4,384,610 A | * | 5/1983 | Cook et al. | ................. | 165/80.2 |
| 4,521,363 A | * | 6/1985 | Vogel | .................... | 264/171.14 |
| 5,540,797 A | * | 7/1996 | Wilson | ........................ | 156/180 |
| 5,783,013 A | * | 7/1998 | Beckman et al. | ........... | 156/180 |

FOREIGN PATENT DOCUMENTS

GB 1546764 * 5/1979 ............ B29D/3/02

* cited by examiner

Primary Examiner—J. A. Lorengo
(74) Attorney, Agent, or Firm—Weingarten, Schurgin, Gagnebin & Lebovici LLP

(57) ABSTRACT

A pultrusion die is usually fashioned of multiple pieces. One or more die components, and possibly all die components, can be formed by facing less precisely machined and finished tooling materials with highly polished sheet metal. Other possible die components can be formed from conventionally machined and polished steel surfaces. The surfaces that will form the inside of the die are highly polished. The components are fastened together in a pattern that will assure uniform pressure and good heat transfer among the components. The entrance and exit orifices are optionally provided with beveled edges to improve entrance of materials into and release of the finished product from the die.

11 Claims, 9 Drawing Sheets

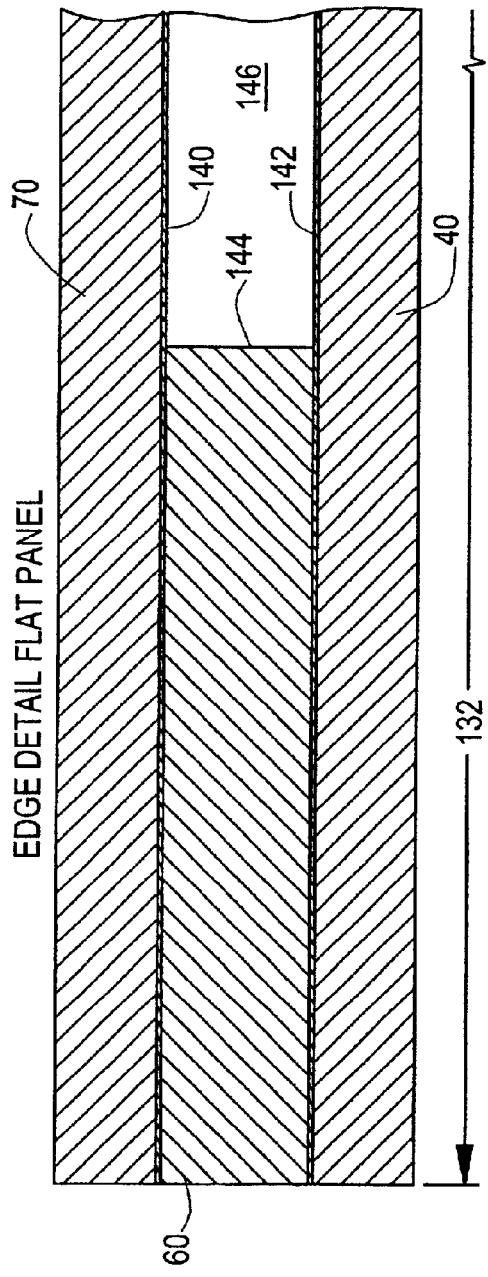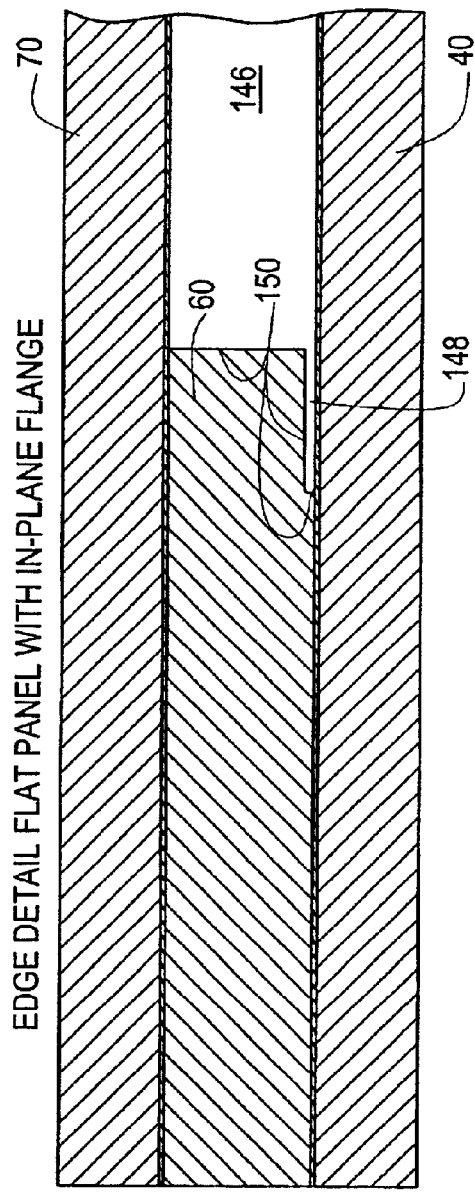

LOW COST TOOLING TECHNIQUE FOR PRODUCING PULTRUSION DIES

CROSS REFERENCE TO RELATED APPLICATIONS

This application claims the benefit under 35 U.S.C. §119 (e) of U.S. Provisional Application No. 60/242,529, filed Oct. 23, 2000 the entire disclosure of which is incorporated herein by reference.

STATEMENT REGARDING FEDERALLY SPONSORED RESEARCH OR DEVELOPMENT

This invention was made in part with United States Government Support under Contract Number F04606-96-C-0086, awarded by the United States Air Force. Therefore, the U.S. Government has certain rights in the invention.

BACKGROUND OF THE INVENTION

Pultrusion is a cost effective manufacturing process for producing continuous runs of constant cross section structural members made from fiber reinforced composite material, particularly those made using thermoset and thermoplastic matrix materials. The details of a particular pultrusion process implementation vary depending on the specific materials being converted to useful structures and the shape of the structures being produced. In general, in a typical pultrusion process, a succession of processing operations is arranged one after the other in series and designed to function together as a single, continuously flowing stream, with each step of the process automatically feeding the next with a steady flow of material. In one implementation, dry materials, in the form of individual tows of fibers (i.e., like thread on a spool) and/or fabrics of the same or different fiber on creels are continuously fed into a set of guides that form the materials into the general shape of the finished components. The materials are then fed into a station that completely wets the dry fiber materials with the matrix resin. The wet materials then enter the pultrusion die, in which the resin reacts or cures to a solid material. Curing may continue with additional heaters downstream of the die exit. A pulling mechanism is used to move the material continuously through the process at a steady pace. The production line may end with a cutting mechanism to cut the finished product to predetermined lengths.

The pultrusion process requires highly polished die surfaces that are often chrome (or other metal) plated in order to provide the combination of low surface friction and wear resistance required to successfully pass composite product through the die without excessive friction or product adhesion to the die surface.

A pultrusion die is usually made with multiple parts, each part typically being made from a precisely machined and polished, structural, heat transmitting, high quality, costly tooling steel. Usually top and bottom die components are the largest parts of the pultrusion tool, and span a pultrusion machine's width. The interior surfaces of the die components facing a die cavity generally have a high degree of surface polish, and often a mirror surface. The cost of both the high quality tooling materials and the polishing needed to achieve surfaces with the required surface finish makes conventional pultrusion tooling relatively expensive. Tool cost increases as tool size increases, and can often be prohibitive, particularly for short prototyping runs of large parts.

One application of the pultrusion process is the production of sandwich panels made with foam core and thin composite skins. In one example of how a sandwich panel might be pultruded, sheets of core, often in the form of a homogeneous closed-cell foam, that have been cut to the proper thickness and width are butted edge-to-edge so that no significant gap exists between the trailing edge of the first-to-be-introduced foam sheet and the leading edge of the next-introduced sheet of foam. These sheets are introduced between upper and lower skins of fiber fabric at any point before the entrance to the pultrusion die. The foam then moves through the process with the skins. The closed cell foam prevents resin impregnation into the cores. The finished part exits the die as two rigid cured composite face sheets laminated to the thicker, lightweight core.

A limitation to the size of finished parts produced by the pultrusion process is the cost to fabricate large dies. As the components being considered for pultrusion become ever larger, the costs associated with providing such high quality surfaces on large steel plates becomes increasingly larger, due to the quality of steel required and to handling difficulties with the large plates (possibly greater than 10 feet wide and more than 3 inches thick, weighing many thousands of pounds).

SUMMARY OF THE INVENTION

A low cost alternative to conventional pultrusion tooling methods achieves a highly polished pultrusion die surface by replacing the conventional machining and polishing of expensive tooling steel with lining some or all of the die's interior surfaces with highly polished, low cost, commercially available sheet steel. Using this technique, the component surfaces, that do not form the cavity, and possibly the mating surfaces of the die components, are optionally finished to less exacting, less expensive levels. Through holes, tapped holes and tooling pins are drilled in the components so that the die components can be fastened together with the polished surfaces facing the interior and forming the cavity. When the entrance and exit orifices have rounded or beveled edges, the sheeting material conforms to the adjacent plate surfaces, allowing material to feed into the die more smoothly and the finished pultruded product to release from the tool more easily. Heaters and other components needed for the pultrusion process are added to the die before or after it is mounted on the pultrusion machine. Side edges with features such as flanges or recessed regions are formable with the polished sheeting die system. The sides of the cavity can be made using more conventional tooling techniques and integrated with other tooling components lined with polished sheet to form a complete pultrusion die. Alternatively, the side pieces of the cavity can be formed less expensively and lined with polished sheet before being integrated with the other components. The technique works well for large, flat panel dies, and can also be used to make tools with rounded surfaces, multiple cavities, multiple curvatures and other complex cross sections. Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which:

FIG. 5 is a side view of the left side of a die producing a straight edge according to the invention;

FIG. 6 is a side view of the left side of a die producing an edge with a flange according to the invention;

DETAILED DESCRIPTION OF THE INVENTION

Figure 1:
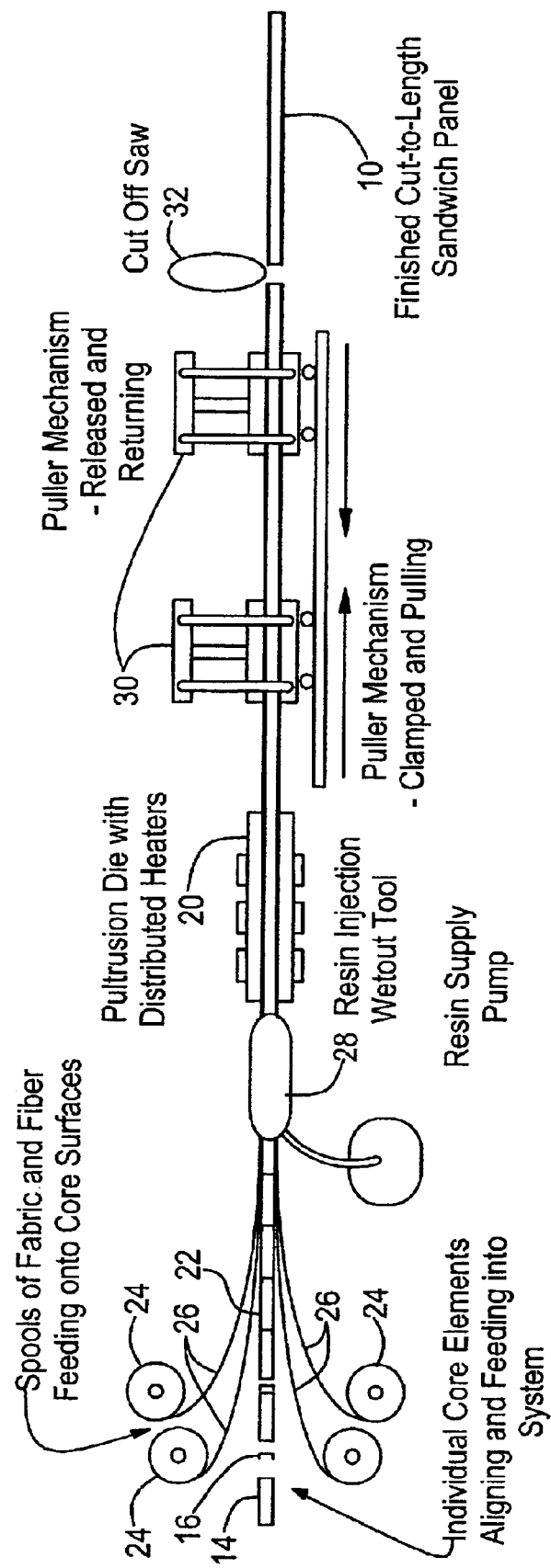
FIG. 1 is a block diagram of a typical implementation of the pultrusion process as is known in the industry.

A pultrusion die is, according to the invention, usually a multi-part steel tool having a mirror-polished internal cross section of the pultruded composite product machined as a cavity through its length. A pultrusion line incorporating a pultrusion die 20 according to the present invention is shown in FIG. 1. Dry materials 26 and 22 are placed together before being wetout by either a resin bath (not shown) or a resin injection tool 28. The composite mixture then compresses as it passes through the pultrusion die 20 with distributed heaters, where the resin is activated and starts curing. A puller mechanism 30 grips the product assuring a constant speed through the die 20. A cut off saw 32 cuts the finished product to length.

The die 20 comprises a low cost, large panel die cavity formed by surfacing the flat, angled, or curving surfaces of rough-machined metal outer plate components with a highly polished, commercially available sheet metal. This saves considerable expense that would have been otherwise spent polishing the surfaces of a conventionally-built die and allows use of construction grade material, which may include more voids than expensive tool grade material, for the largest component of the die. The polished sheet metal is fastened to the leading edge (entry for uncured materials) and sides of the die 20. Fastening may be accomplished by screws, bolts or a bonding method such as adhesive or brazing. Conductive grease may be interposed between the plates 40, 70 and the sheets 140, 142 to improve heat transfer where necessary.

Figure 2:
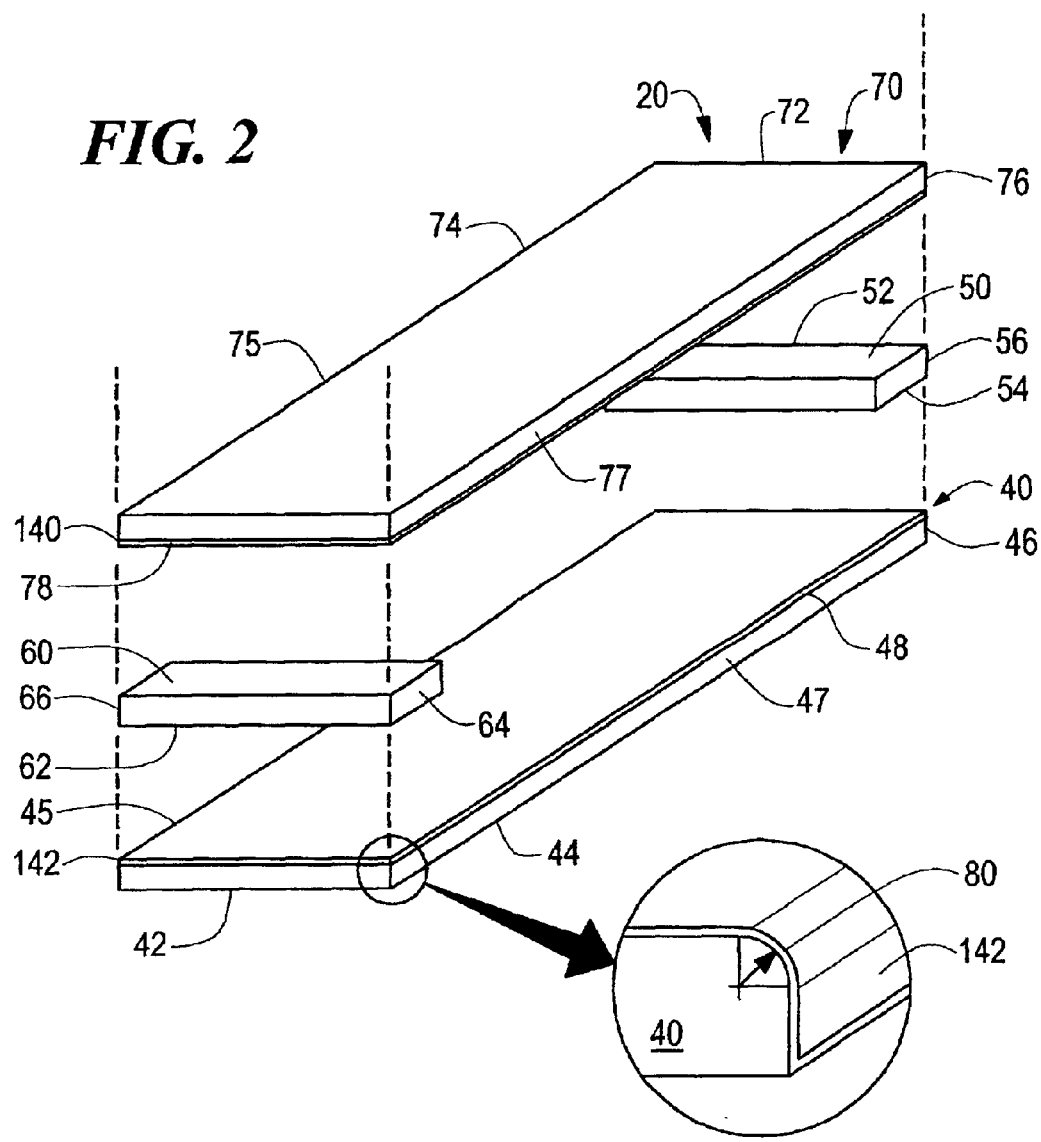
FIG. 2 is an exploded isometric view of the die according to the invention.
Figure 3:
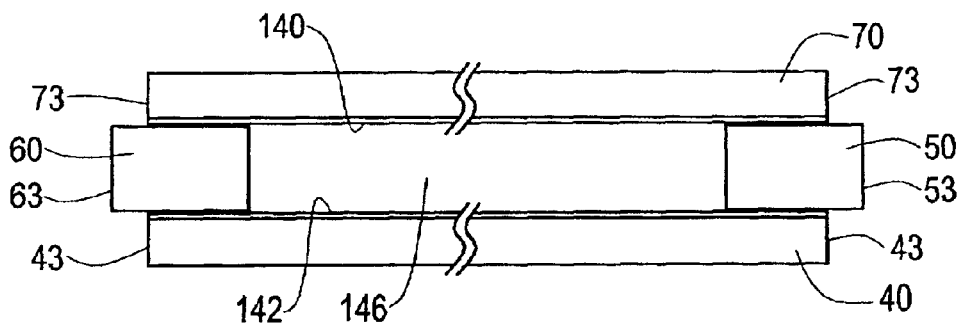
FIG. 3 is a front view of the die of FIG. 2.

FIG. 2 is a simple rectangular die embodiment built using this process. More complex shapes can be similarly made. The die components consist of a bottom plate 40 and a top plate 70, each faced with a polished sheeting material 140, 142, and side spacers 50, 60 that may be made up of multiple parts (not shown). The finished cross section of the cavity 146, as shown in FIG. 3, is defined by the height of the side spacers 50, 60 and the width 74 of the top (or bottom) plate 70 minus the overlap between spacers 50, 60 and the plates 40, 70 (typically the width 64 of the spacers 50, 60). The length 42 of the die is selected to allow sufficient heating and cooling. The finished product is often longer than the die length 42.

The material for the die components must transmit heat uniformly, not expand excessively at the temperature used to cure the resins, and be able to be manufactured with a highly uniform surface. Typical die component materials are tooling grade steel, although other metals and materials that are sufficient for adequate heat distribution may be readily selected by one skilled in the art. In one implementation, die components that are faced by polished sheet material are produced from construction grade steel, such as A36 steel, finished to between approximately 32–64 micro inch smoothness by a process such as rotary surface grinding. The tolerance for the non-cavity surfaces is determined by the tightness of fit required for product quality and heat transfer. Die components that directly form part of the die cavity are produced from tool grade steel finished to between approximately 8–16 micro inch smoothness. Highly polished sheet steel (with or without a chrome coating that is used for ruggedness) is commercially available finished to approximately 8 micro inch smoothness.

The width of side 54, 64 of the side spacers 50, 60 is chosen to allow at least sufficient surface area for the vertical connection of the die components. This connection is typically accomplished with screws or bolts, clamping the surfaces tightly enough that heat is transmitted from the top and bottom plates to the side plates that are not heated. In one implementation, side spacers 50, 60 are supplied with multiple sets of through holes to allow some variation in cavity width in a die built with the same side spacers 50, 60.

The thickness of the top and bottom plates 40, 70 is selected to provide a uniform surface with sufficient heating capacity and controlled sag across its width. In one embodiment, the entrance and exit edges 45, 75, 47, and 77 of the top and bottom plates 40, 70 may be beveled 80, as illustrated in the detail of FIG. 2, to facilitate lead-in of material and provide an easier surface for wrapping the sheet material around the plate. The side spacers 50, 60 are optionally made shorter than the top and bottom plates 40, 70 to allow for the beveling of the edges and the addition of auxiliary components to the corners of the die as needed. FIG. 3 is a front view of the die of FIG. 2 illustrating the cavity 146 and that, when a modular spacer 50, 60 is used, the outside edges 53, 63 of side spacers 50, 60 do not necessarily align with the outside edges 43, 73 of the top and bottom plates 40, 70.

Figure 4:
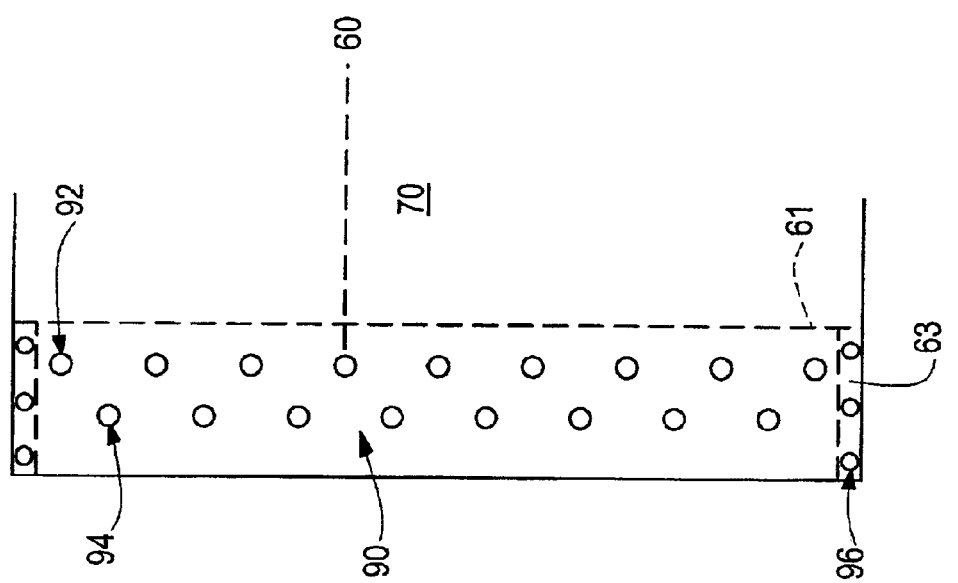
FIG. 4 is a detail of a mounting region of a die according to the invention.

One embodiment of die 20 uses a bolt pattern as illustrated in FIG. 4 along the sides of the top and bottom plates 40, 70 to fasten the die together. Two staggered rows of bolts 90 clamp the die 20 together. The rows of bolts 90 are configured so those bolts are evenly spaced (approximately every 2 in. for one embodiment) along the length of the die 20. One line of bolts 92 is positioned close to the inner edge 61 of the spacer 60, while a second row 94 is further from edge 61 but interposed between the holes of first row 92. When the spacer 60 is shorter than the top and bottom plates 40, 70, auxiliary components may be affixed to the die using bolt holes 60 in the overhang 63. Alternate patterns that provide secure fastening may be used. In one embodiment, the holes in the top plate 70 are countersunk to receive the bolt heads and the holes in the bottom plate (not shown) are tapped. The bolt holes in all other components are through holes allowing the bolt to pass therethrough. The bolts are tightened to a high fraction of their yield strength, such as ⅔ of the yield strength of the bolt in one implementation.

An implemented die according to the invention has successfully produced at least 8-foot wide foam-cored and solid composite panels.

FIG. 5 shows a left side detail of a basic implementation of this die fabrication method. Thin sheets of highly polished steel 140, 142 are sandwiched respectively between structural steel top and bottom plates 40, 70 and a side spacer 60 that defines a vertical edge 144 of the die cavity 146. All five pieces shown are held together using a fastening pattern as described above. This implementation is suitable for fabricating a rectangular cross section solid or cored panel, whose thickness is determined by the spacer 60 dimensions. The panels' width varies with the top and bottom plates 40, 70 and positioning of the spacer edge 144 within the die plates. For a given set of top and bottom die plates 40, 70, spacer 60 is provided with several sets of through holes in some embodiments, allowing some variability of die cavity width without requiring new die plates 40, 70.

Many applications of pultruded panels require edge details that deviate from the form provided by the simple rectangular cross section of FIG. 5. FIGS. 6–13 illustrate several variants of the basic die configuration that accommodate edge details of quite general utility, further variations are within the scope of this disclosure.

FIG. 6 illustrates the die for a product having a thin flange 148 extending from one panel edge outward in the same plane as the main panel. This is easily accommodated with the illustrated die fabrication configuration by relieving the spacer 60 by under cutting one surface to form a product extension 148 in the indicated fashion to form the horizontal flange in the desired product. Three spacer surfaces 150 facing the product are finished with a mirror quality surface (~8 micro inch).

Figure 8:
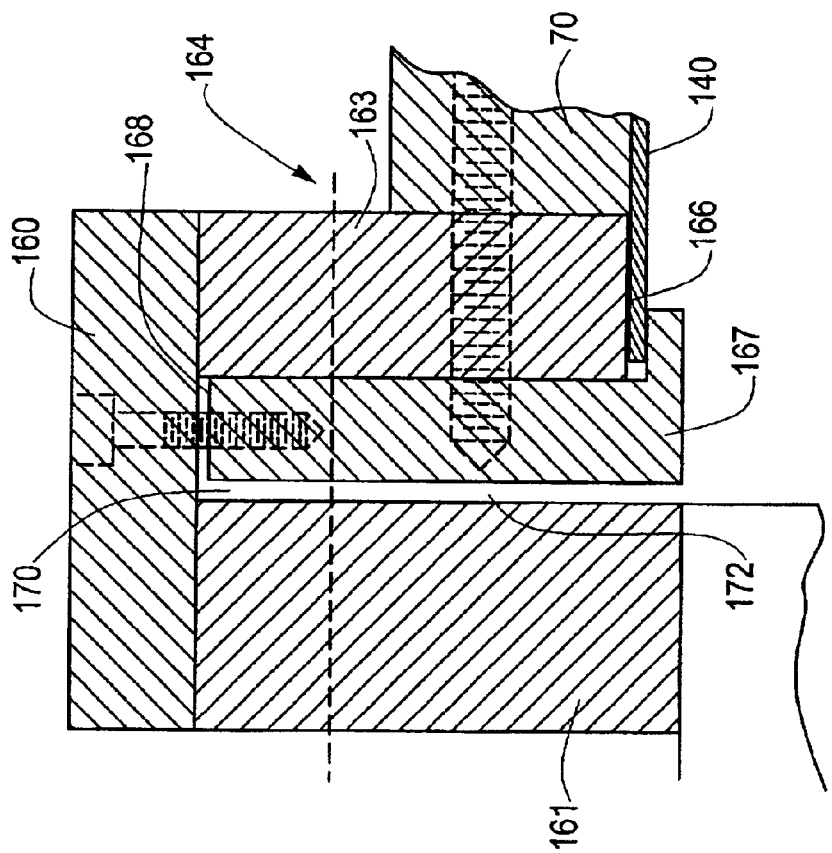
FIG. 8 is a side view of the left side of an alternate implementation of the die of FIG. 7.
Figure 7:
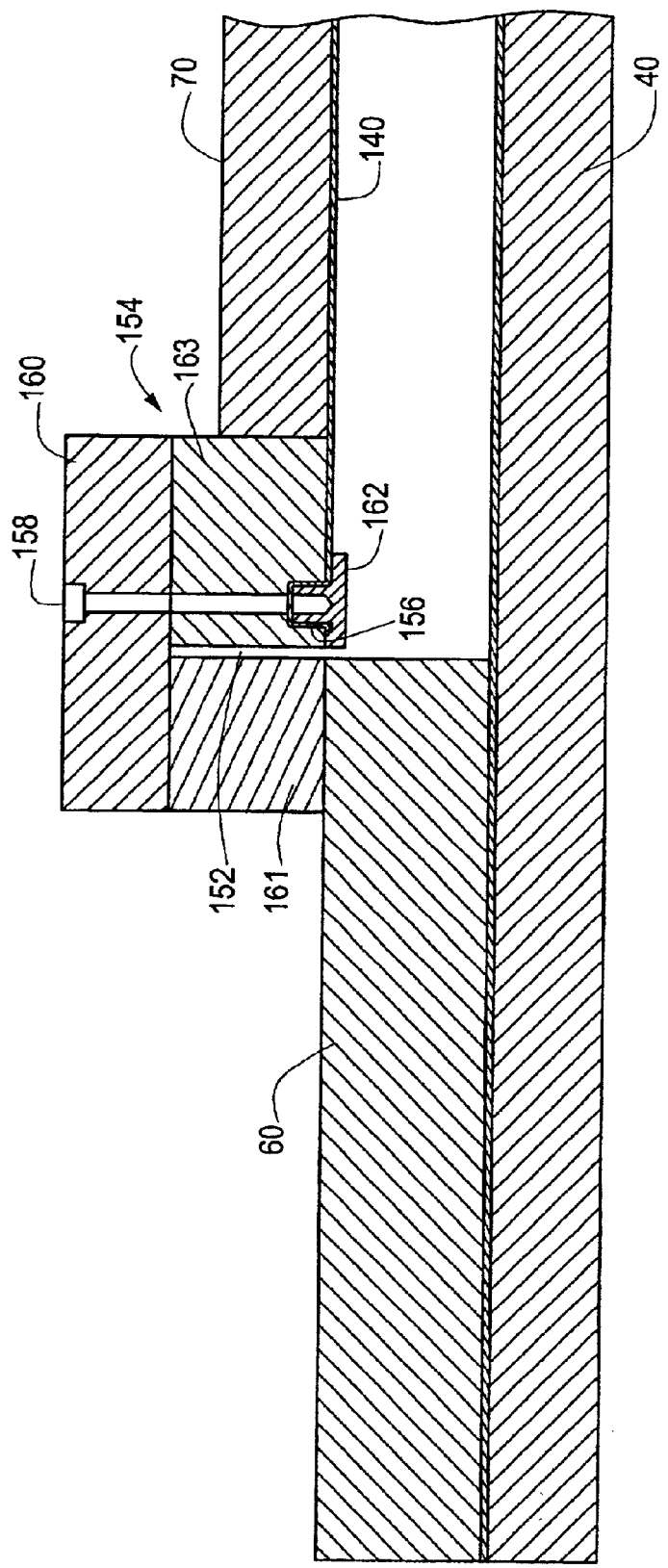
FIG. 7 is a side view of the left side of a die producing an edge with a flange according to the invention.

FIG. 7 illustrates a die configuration for a panel product in which a flange 152 is desired at the panel edge normal to the plane of the main panel. This is accomplished in the polished sheet die by the indicated multi-piece configuration. The key feature of this die configuration is a strip 154 (in the longitudinal—into the paper—direction), composed of a number of pieces 160, 161, 163, that secures an edge 156 of the polished sheet 140 to the top die plate 70. The strip 154 is secured by a row of bolts 158 as indicated to secure the edge 156 of the polished sheet 140, and also to secure the die sub-components 160, 162 together. FIG. 8 illustrates a modification of FIG. 7 in which a strip 164 is securing an edge 166 of the top polished sheet 140. A part 167 holds the edge 166 of the polished sheet 140 against the plate 70 extension 163. This configuration may have some advantages in setting up the die and in finishing the part after it exits the pultrusion machine.

Figure 9:
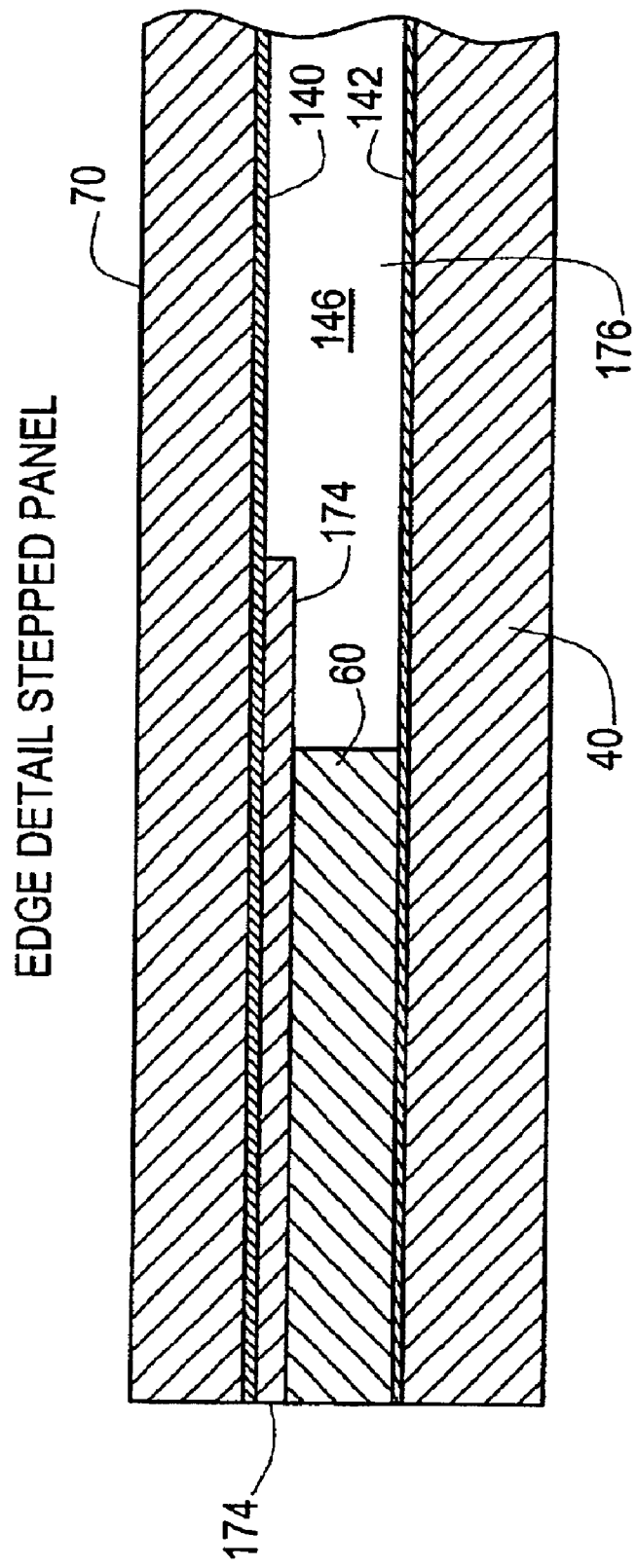
FIG. 9 is a side view of the left side of a die producing an edge with a recessed section according to the invention.

Another product of interest is a panel with a recessed area 176 along one or both edges. This configuration may be manufactured with the polished sheet die by using a multipart side spacer 60, 174 as shown in FIG. 9. Here, a secondary spacer 174 extends further into the cavity 146 to create the recessed area 176, which may be implemented on one or both sides of the panel. As before, only the spacer 174, 60 surfaces facing the die cavity 146 need to be finished to a high quality surface.

Figure 10:
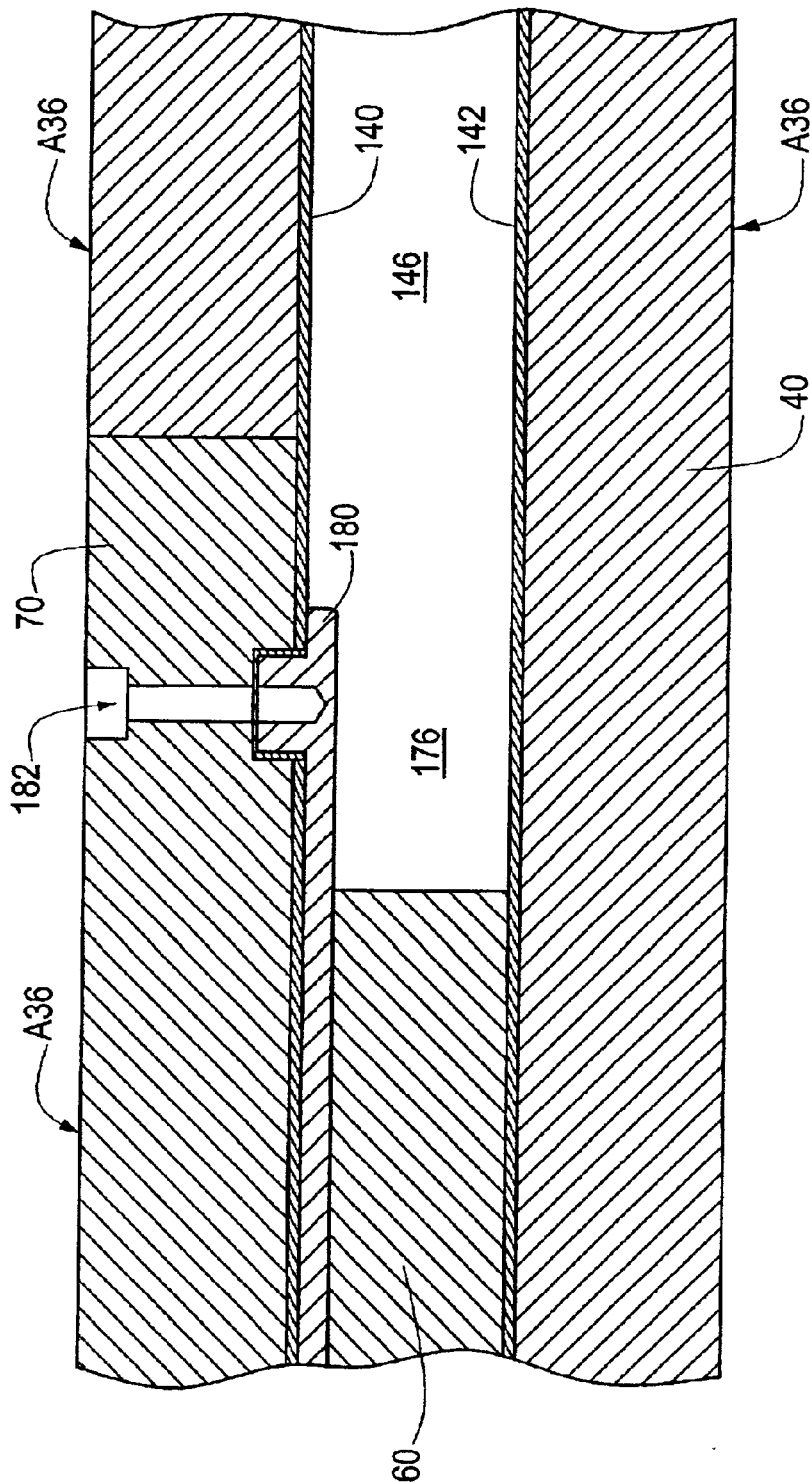
FIG. 10 is a side view of the left side of an alternate implementation of the die of FIG. 9.

FIG. 10 illustrates a second die configuration for creating the recessed panel areas 176, in which the edge of a secondary spacer 180 is secured to the die plate 70 by a line of threaded fasteners 182. This configuration allows longer and more complex recessed areas 176 to be incorporated, but requires that a line of holes be drilled in the polished sheet 140, rendering it less useful for other modularized die configurations.

Figure 11:
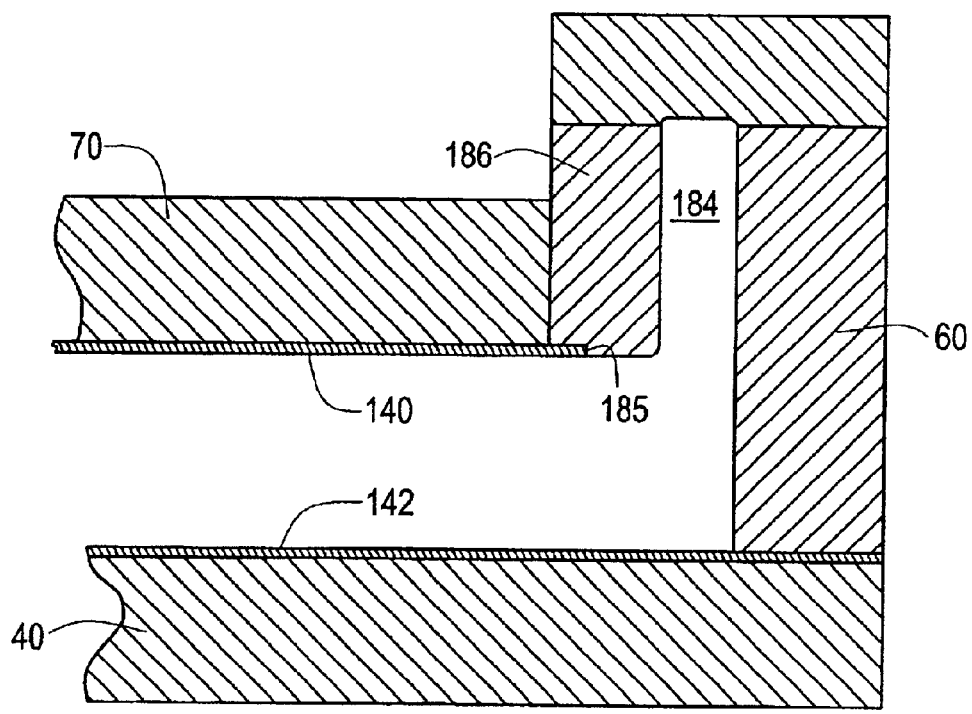
FIG. 11 is a side view of the left side of a die producing an edge with a flange according to the invention.

Another panel edge flange 184 at an angle to the main panel plane is shown in FIG. 11. In this case, an edge 185 of the polished sheet 140 adjacent to the turned-up flange 184 is secured to a die sub-component 186 next to the flange using an adhesive, soldering, brazing or a welding process to provide somewhat more design flexibility in the panel itself. The securing by adhesive, soldering, brazing or welding is an alternative for securing the polished sheet edge as an alternative to the fastening that provides for more modularity.

Figure 12A:
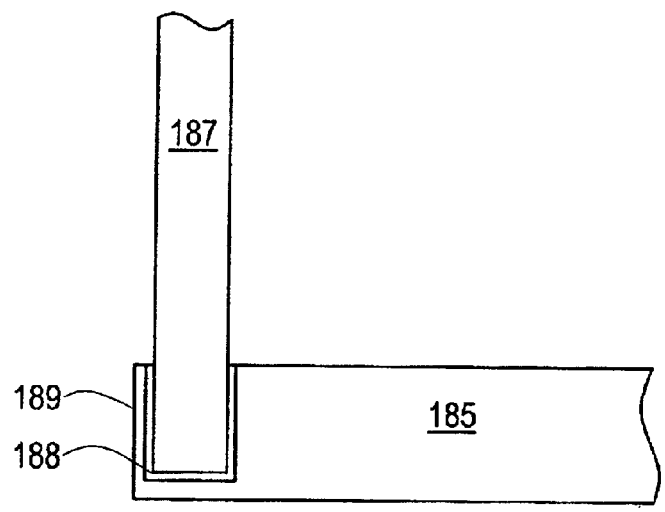
FIG. 12 is a side view of the left side of a die producing an edge with a recess and a flange according to the invention.
Figure 12B:
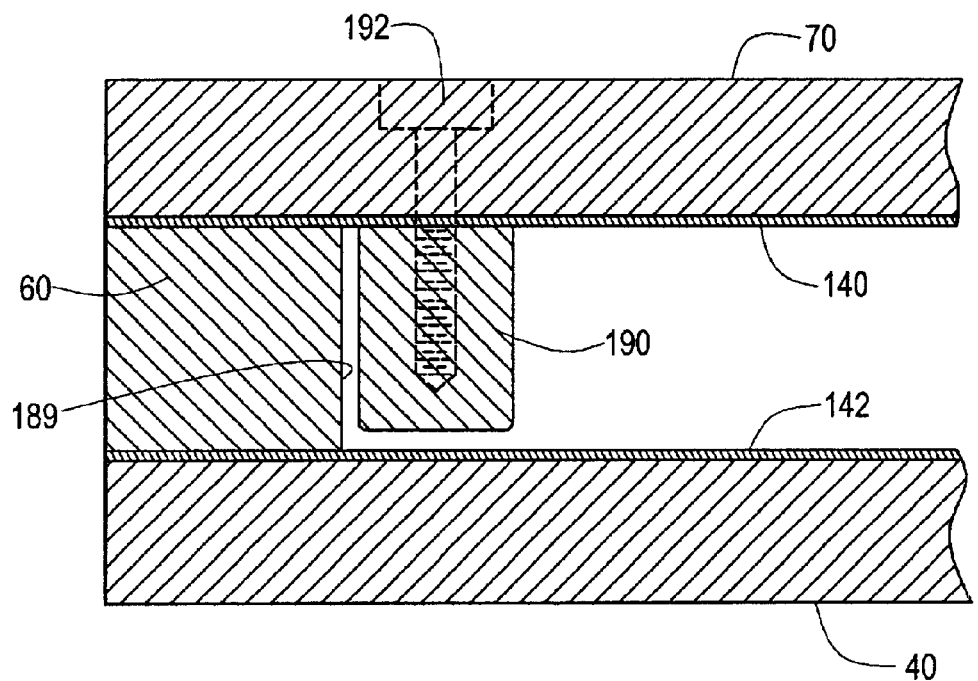

A panel with the recessed area 188 near its outboard edge(s) is shown in FIGS. 12A and 12B, with the die configuration required to produce it. In FIG. 12A, the recess 188 is shown as a convenient way to butt two panels 185, 187 into a perpendicular arrangement. This method provides for an overlapping flange 189 that can be used to secure the panels together. In FIG. 12B, a secondary spacer block 190 or strip is secured to die plate 70, with a line of fasteners 192, which also penetrate the polished sheet 140. Both the side edge of spacer 60 and the sides of the secondary spacer block must be finished to mirror polish in this configuration.

Figure 13:
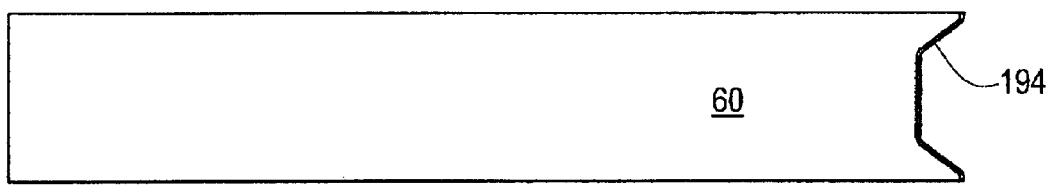
FIG. 13 is a side view of the left side of a die producing a shaped edge according to the invention.

Several different types of edge detail may be machined into the edge 194 of side spacer 60, as indicated in FIG. 13. For designs of modest physical width and complexity, this method becomes a very simple modification of the die design shown in FIG. 5.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A pultrusion die for use in manufacturing composite material parts by pultrusion, the die comprising:
   die components made with a material comprising cast metal ceramic or plastic; and
   sheets fastened to at least some of the die components, the die components and metal sheets fastened together to form a die cavity, wherein inwardly facing surfaces of the metal sheets are highly polished and form die cavity surfaces.

2. A die for use in manufacturing composite material parts by pultrusion, the die comprising:
   top and bottom plates, generally block-like in shape, of a heat transferring material adapted to be ground to commodity level smoothness, said plates adapted to be connected together via fastening devices;
   highly polished sheet material in heat transferring communication with and forming a facing on a bottom surface of said top plate and a top surface of said bottom plate, said highly polished sheet material extending from a leading edge of said top plate and said bottom plate toward an exit edge of said top plate and said bottom plate, highly polished inwardly facing surfaces of said highly polished sheet material forming die cavity surfaces; and
   a pair of side spacers installed between said faced top and bottom plates, and inner surfaces of said spacers finished to a highly polished surface and remaining surfaces of said spacer finished to a commodity level smoothness, said inner surfaces of said side spacers forming further die cavity surfaces adjoining the die cavity surfaces formed by said highly polished sheet material.

3. The die of claim 2 wherein said commodity level of smoothness is no smoother than a 32 micro inch tolerance.

4. The die of claim 2 wherein said highly polished surface exhibits a smoothness no rougher than approximately an 8 micro inch tolerance.

5. The die of claim 2 wherein said die is held together by bolts arrayed along a lengthwise edge of said die.

6. The die of claim 2 wherein said highly polished material is held to said top and bottom plates by clamping.

7. The die of claim 2 wherein a heat-conducting grease is interposed between said highly polished material and said top and bottom plates.

8. The die of claim 2 wherein said top and bottom plates are made of construction-grade steel.

9. A The die of claim 2 wherein said side spacers are made of tool-grade steel.

10. The die of claim 2 wherein said highly polished sheet material is fastened to said top and bottom plates by a method selected from the group of adhesiving, brazing, soldering and welding.

11. A pultrusion assembly comprising the die of claim 2 and further comprising:

an aligning and feeding mechanism;

a resin bath disposed to receive material from said aligning and feeding mechanism and to feed wetted material to said die;

distributed heaters in heat transferring communication with said die for heating said die; and a pulling mechanism applying pulling force to material exiting said die.

* * * * *

UNITED STATES PATENT AND TRADEMARK OFFICE
CERTIFICATE OF CORRECTION

PATENT NO. : 6,764,057 B2
DATED : July 20, 2004
INVENTOR(S) : Jerome P. Fanucci et al.

It is certified that error appears in the above-identified patent and that said Letters Patent is hereby corrected as shown below:

Column 6,
Line 35, "sheets" should read -- metal sheets --;
Lines 52-53, "facing surf aces of" should read -- facing surfaces of --; and Column 7,
Line 8, "A The die" should read -- The die --.

Signed and Sealed this

Seventh Day of June, 2005

JON W. DUDAS
*Director of the United States Patent and Trademark Office*